(12) United States Patent
Chatterjee et al.

(10) Patent No.: US 8,397,197 B1
(45) Date of Patent: Mar. 12, 2013

(54) INTEGRATED CIRCUIT MODULE TIME DELAY BUDGETING

(75) Inventors: Mitrajit Chatterjee, San Jose, CA (US); Sandeep Badida, San Ramon, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 83 days.

(21) Appl. No.: 13/115,858

(22) Filed: May 25, 2011

(51) Int. Cl.
*G06F 17/50* (2006.01)

(52) U.S. Cl. .................... 716/118; 716/132; 716/134

(58) Field of Classification Search ............... 716/108, 716/113, 118–119, 122, 132, 134
See application file for complete search history.

(56) References Cited

U.S. PATENT DOCUMENTS

| | | | | |
|---|---|---|---|---|
| 6,401,231 | B1* | 6/2002 | Belkhale et al. | 716/108 |
| 6,578,183 | B2* | 6/2003 | Cheong et al. | 716/113 |
| 6,701,496 | B1* | 3/2004 | Fischer | 716/104 |
| 7,007,254 | B1* | 2/2006 | Borkovic et al. | 716/122 |
| 7,146,595 | B2* | 12/2006 | Knol et al. | 716/119 |
| 7,318,211 | B2* | 1/2008 | Cadieux | 716/112 |
| 7,418,686 | B1* | 8/2008 | Knol et al. | 716/118 |
| 7,681,158 | B2* | 3/2010 | Uchino et al. | 716/113 |
| 8,239,805 | B2* | 8/2012 | Rao et al. | 716/125 |
| 8,250,509 | B2* | 8/2012 | Daede et al. | 716/113 |
| 8,341,573 | B2* | 12/2012 | Rao et al. | 716/108 |
| 2002/0087939 | A1 | 7/2002 | Greidinger et al. | |
| 2002/0087940 | A1 | 7/2002 | Greidinger et al. | |
| 2003/0005398 | A1* | 1/2003 | Cho et al. | 716/8 |
| 2003/0014720 | A1* | 1/2003 | Ito et al. | 716/6 |
| 2003/0079192 | A1* | 4/2003 | Cheong et al. | 716/7 |
| 2003/0188271 | A1 | 10/2003 | Zhuang et al. | |
| 2003/0196182 | A1 | 10/2003 | Hahn | |
| 2004/0003360 | A1 | 1/2004 | Batchelor et al. | |
| 2004/0025129 | A1 | 2/2004 | Batchelor | |
| 2005/0034091 | A1 | 2/2005 | Harn | |
| 2005/0081173 | A1 | 4/2005 | Peyran | |
| 2005/0204315 | A1* | 9/2005 | Knol et al. | 716/2 |
| 2006/0053396 | A1 | 3/2006 | Eng | |
| 2007/0055952 | A1 | 3/2007 | Cadieux | |
| 2007/0106969 | A1 | 5/2007 | Birch et al. | |
| 2007/0186205 | A1 | 8/2007 | Yu et al. | |
| 2008/0005707 | A1 | 1/2008 | Papanikolaou et al. | |
| 2009/0031268 | A1 | 1/2009 | Miranda et al. | |
| 2009/0070714 | A1 | 3/2009 | Shenoy | |

(Continued)

OTHER PUBLICATIONS

Sarrafzadeh, M; A Delay Budgeting Algorithm Ensuring Max. Flexibility . . . ; Computer-Aided Design of ICs&Syst,IEEE; Nov. 1997; pp. 1332-1341; vol. 16-issue11; IEEE; USA.

(Continued)

*Primary Examiner* — Stacy Whitmore (57) ABSTRACT

A circuit analysis tool is provided, enabled as computer software instructions, for budgeting time delays between integrated circuit (IC) modules. The instructions accept a command enabling an IC floor-plan including a first module and a second module. The first module includes a first circuit element having a signal output interface, and an output port. The second module includes an input port, and a second circuit element having a signal input interface. A command is accepted defining a maximum delay value, and a first delay value is estimated between the first circuit element signal output interface and the first module output port. A second delay value is estimated between the second circuit element signal input interface and the second module input port, and a third delay value is estimated between the first module output port and the second module input port. The first, second, and third delay values are summed, creating a time budget estimate. The time budget estimate is approved if it is less than the maximum delay value.

20 Claims, 7 Drawing Sheets

U.S. PATENT DOCUMENTS

| | | |
|---|---|---|
| 2009/0083681 A1 | 3/2009 | Mccoo et al. |
| 2010/0275168 A1 | 10/2010 | Shibatani et al. |
| 2010/0318954 A1 | 12/2010 | Yu et al. |
| 2011/0040548 A1 | 2/2011 | Khalily et al. |
| 2011/0041114 A1 | 2/2011 | Komatsu |
| 2012/0124537 A1* | 5/2012 | Daede et al. ............... 716/113 |
| 2012/0174048 A1* | 7/2012 | Rao et al. .................. 716/108 |

OTHER PUBLICATIONS

Bozorgzadeh, E.; Optimal Integer Delay Budget . . . ; Computer-Aided Design of ICs&Syst,IEEE; Month 2004; vol. 23-No. XX; IEEE; USA.

Singhal, L.; Fast Timing Closure by Interconnect . . . ; Computer-Aided Design, 2005; ICCAD-2005; Nov. 2005; pp. 792-797; IEEE; USA.

* cited by examiner

INTEGRATED CIRCUIT MODULE TIME DELAY BUDGETING

BACKGROUND OF THE INVENTION

1. Field of the Invention

This invention generally relates to integrated circuit (IC) design and, more particularly, to a method for allocating timing delay budgets across IC modules using gate-delay and wire-distance estimates.

2. Description of the Related Art

The size, complexity, and operating or switching speeds of semiconductor ICs have increased, while feature geometries have decreased, and interconnect systems for such ICs have dramatically increased in complexity. In a digital circuit, data is supposed to move in lockstep, advancing one stage on each tick of the clock signal. This is enforced by synchronizing elements such as flip-flops or latches, which copy their input to their output when instructed to do so by the clock.

As noted in Wikipedia, one approach that is used to analyze timing errors is to model the interconnect system as an arrangement of nets (interconnections between gate outputs and interconnected gate inputs) inter-coupled with parasitic capacitors. Static Timing Analysis (STA) is used to develop early and late arrival times (timing window) for each relevant net or node. This timing window is enlarged by a worst case assessment of crosstalk noise for both early and late arrival times using noise aware STA. This worst case timing window is used for timing analysis of all paths through the corresponding net and a list of paths that fail timing requirements are provided. In static timing analysis, the word static alludes to the fact that this timing analysis is carried out in an input-independent manner, and purports to find the worst-case delay of the circuit over all possible input combinations.

More explicitly, STA is a method of computing the expected timing of a digital circuit without performing a simulation. High-performance ICs have conventionally been characterized by the clock frequency at which they operate. Gauging the operation of a circuit at a specified speed requires an ability to measure, during the design process, its delay at numerous steps. Moreover, delay calculations must be incorporated into the inner loop of timing optimizers at various phases of design, such as logic synthesis, layout (placement and routing), and in-place optimizations performed late in the design cycle. While such timing measurements can theoretically be performed using a rigorous circuit simulation, such an approach is liable to be too slow to be practical. Static timing analysis plays a vital role in facilitating the fast and reasonably accurate measurement of circuit timing. The main goal of static timing analysis is to verify that despite these possible variations, all signals will arrive neither too early nor too late, and hence proper circuit operation can be assured. Faster design times are a result of using simplified STA delay models, and a limited consideration of the effects of logical interactions between signals.

One problem with STA is that the analysis can only be performed after the design and layout of a digital circuit. However, before the design is started, some estimations must be made to aid in the budgeting of time inside modules and between modules. Typically, module level time-budgeting is done manually or at a later stage in the design-cycle, when the contents and the details of the sub-modules are better known. By then, it may be too late to change the micro-architecture without impacting the design and schedule.

It would be advantageous if there was a means of creating timing budget estimates based upon on an early floor-plan, to insure that the modules in an IC are designed to realistic timing specifications.

SUMMARY OF THE INVENTION

Disclosed herein is a method of estimating interface timing paths between modules in an integrated circuit (IC) using expected gate-delays, wire-distances, wire-type, fallout, and other design considerations, based on an early floor-plan. Thereafter, all the interface timing paths (timing budgets) of the modules can be measured at the top-level to make sure they meet the design target. Since the module level timing budgets are made with a high level of confidence, each module can be designed independently. In addition, this approach also enables early micro-architecture validation of the module interfaces Accordingly, a circuit analysis tool is provided, enabled as computer software instructions, for budgeting time delays between IC modules. The instructions accept a command enabling an IC floor-plan including a first module and a second module. The first module includes a first circuit element having a signal output interface, and an output port. The second module includes an input port, and a second circuit element having a signal input interface. A command is accepted defining a maximum delay value, and a first delay value is estimated between the first circuit element signal output interface and the first module output port. A second delay value is estimated between the second circuit element signal input interface and the second module input port, a and a third delay value is estimated between the first module output port and the second module input port. The first, second, and third delay values are summed, creating a time budget estimate. The time budget estimate is approved if it is less than the maximum delay value.

More explicitly, estimating the first delay value includes the sub-instructions of:
  estimating a first gate delay between the first circuit element signal output interface and the first module output port;
  estimating a first wire delay between the first circuit element signal output interface and the first module output port; and,
  summing the first gate delay with the first wire delay;
  Likewise, estimating the second delay value includes the sub-instructions of:
  estimating a second gate delay between the second circuit element signal input interface and the second module input port;
  estimating a second wire delay between the second circuit element signal input interface and the second module input port; and,
  summing the second gate delay with the second wire delay.
  Finally, estimating the third delay value includes the sub-instructions of:
  estimating a third gate delay between the second module input port and the first module output port;
  estimating a third wire delay between the second module input port and the first module output port; and,
  summing the third gate delay with the third wire delay.
  Additional details of the method performed by above-described instructions are provided below.

DETAILED DESCRIPTION

As used in this application, the terms "component," "module," "system," and the like may be intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The computer devices described below typically employ a computer system with a bus or other communication mechanism for communicating information, and a processor coupled to the bus for processing information. The computer system may also include a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium cause a processor to perform timing budget estimations. The practical implementation of such a computer system would be well known to one with skill in the art.

Figure 2A:
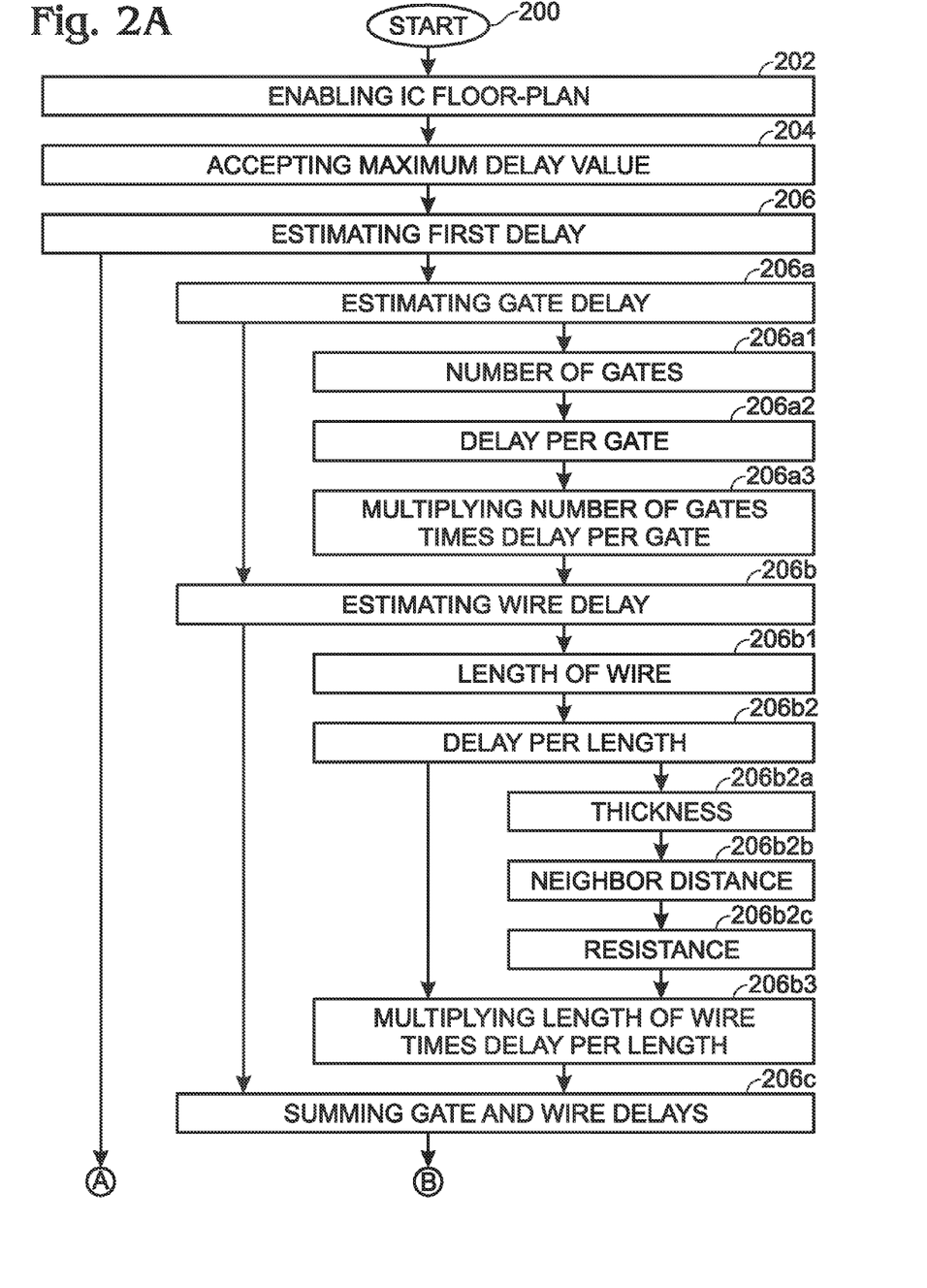
FIGS. 2A and 2B are flowcharts illustrating a circuit analysis tool, enabled with software instructions stored in a computer-readable medium and executable by a processor, for budgeting time delays between IC modules.
Figure 2B:
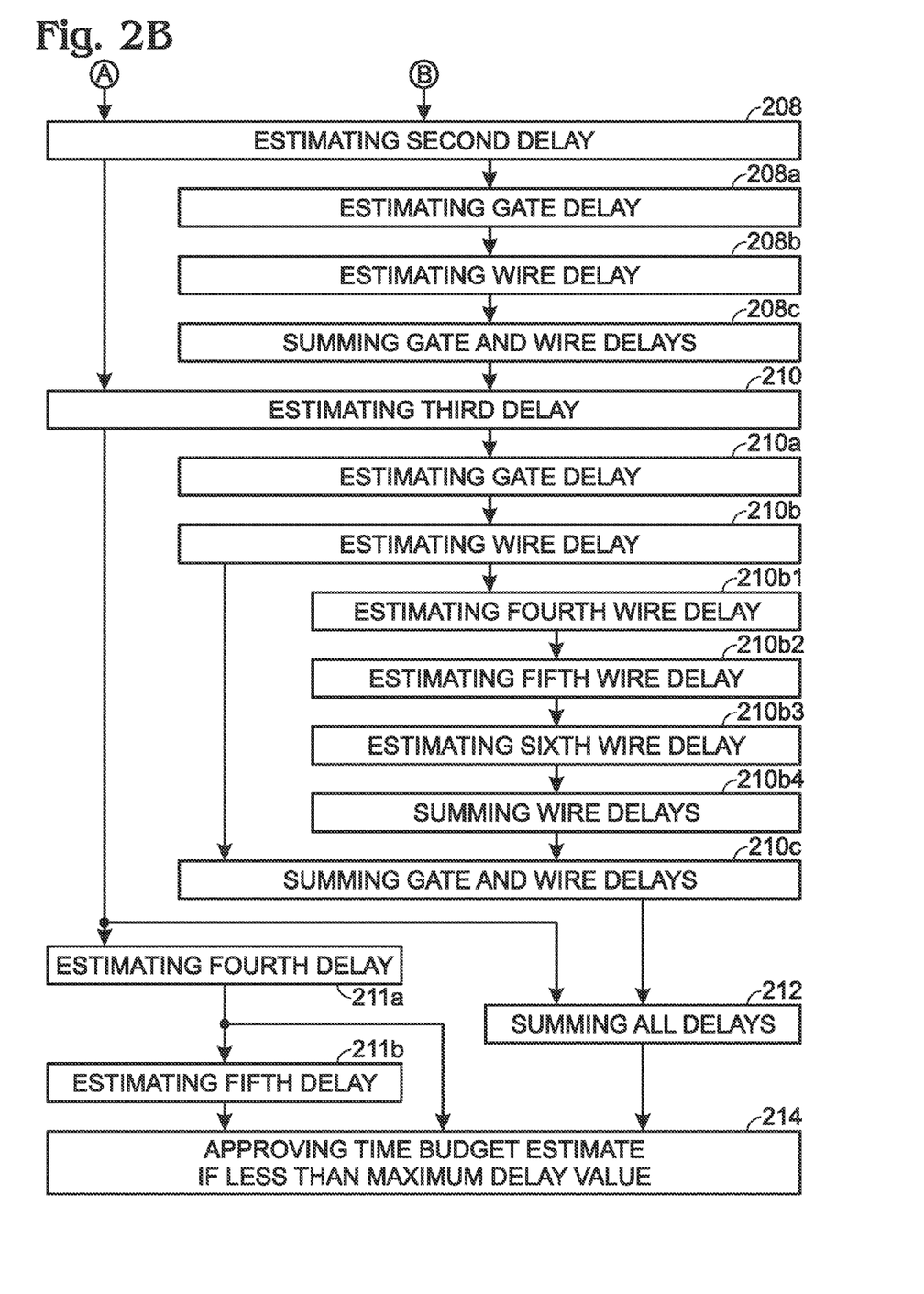

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read. As such, the software instructions described below in FIG. 2 may be stored in a computer-readable medium.

Figure 1:
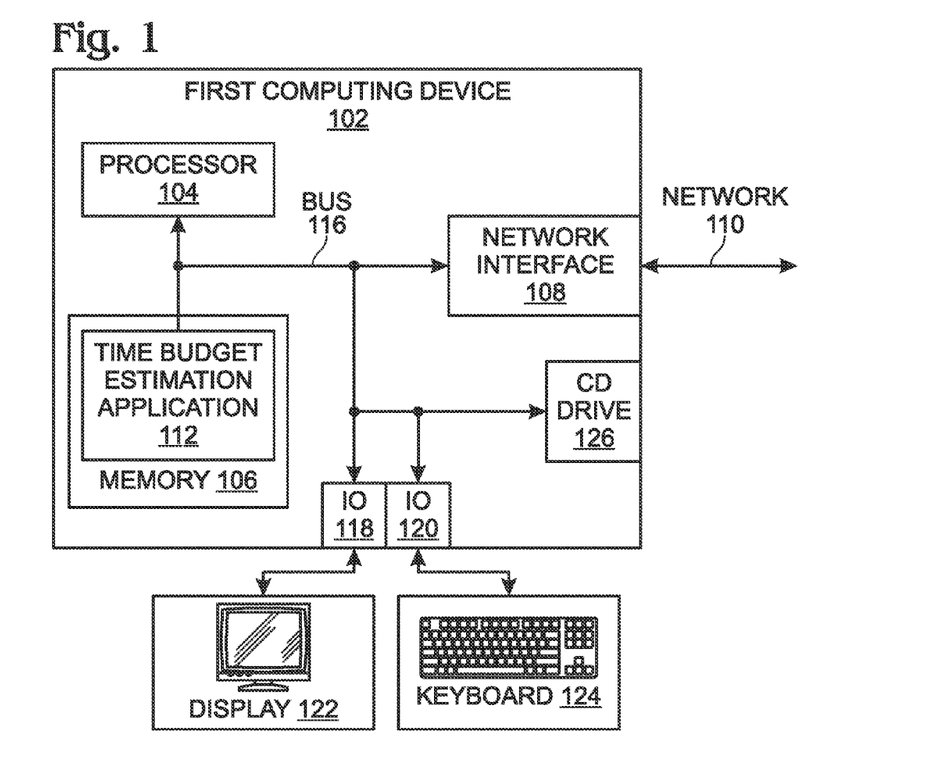
FIG. 1 is a schematic block diagram depicting a computing device capable of supporting the instructions associated with budgeting time delays between integrated circuit (IC) modules.

FIG. 1 is a schematic block diagram depicting a computing device capable of supporting the instructions associated with budgeting time delays between integrated circuit (IC) modules. The system 100 comprises a first computing device 102 including a processor 104, a memory 106, and a network interface 108 connected to the network on line 110. A time budget estimation application 112 is stored in the memory 106, and enabled as a software application of sequential instructions stored in the memory 106 and executed by the processor 104.

The first computing device 102 may be a personal computer (PC), workstation, server, or processor-enabled printer. The processor or central processing unit (CPU) 104 may be connected to memory 106 via an interconnect bus 116. The processor 104 may include a single microprocessor, or may contain a plurality of microprocessors for configuring the computer device as a multi-processor system. Further, each processor may be comprised of a single core or a plurality of cores. The memory 106 may include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the processor 104.

The memory 106 may also comprise a mass storage with one or more magnetic disk or tape drives or optical disk drives, for storing data and instructions for use by processor 104. For a workstation PC, for example, at least one mass storage system in the form of a disk drive or tape drive, stores the operating system and application software. The mass storage may also include one or more drives for various portable media, such as a floppy disk, a compact disc read only memory (CD-ROM) 126, or an integrated circuit non-volatile memory adapter (i.e. PC-MCIA adapter) to input and output data and code to and from the first computing device 102.

The first computing device network interface 108 may be more than one interface, shown by way of example as an interface for data communications via a network 110. The interface may be a modem, an Ethernet card, or any other appropriate data communications device. The physical communication links may be optical, wired, or wireless.

The first computing device 102 may further include appropriate input/output ports on lines 118 and 120 for user interface interconnection, respectively, with a display 122 and a keyboard 124. For example, the first computer device may include a graphics subsystem to drive the output display. The output display 122 may include a cathode ray tube (CRT) display or liquid crystal display (LCD). The input control devices for such an implementation may include the keyboard for inputting alphanumeric and other key information. The input control devices on line 124 may further include a cursor control device (not shown), such as a mouse, a touchpad, a trackball, stylus, or cursor direction keys. The links to the peripherals on line 124 may be wired connections or use wireless communications. Although not explicitly shown, the first computing device 102 may further comprise co-processors, associated digital signal processors (DSPs), and associated graphics processing units (GPUs). In one aspect, the time budget estimation application is loaded into memory 106 from CD drive 126, or loaded from memory 106 to CD drive 126.

FIGS. 2A and 2B are flowcharts illustrating a circuit analysis tool, enabled with software instructions stored in a computer-readable medium and executable by a processor, for budgeting time delays between IC modules. The use of computers to read and execute instructions from memory is well known in the art, and the instructions are not limited to any particular protocol or computer hardware. Although the method performed by the instructions is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The instructions start at Step 200.

Step 202 accepts a command enabling an IC floor-plan including a first module and a second module. The first module includes a first circuit element having a signal output interface, and an output port. The second module includes an input port, a second circuit element having a signal input interface.

Figure 3:
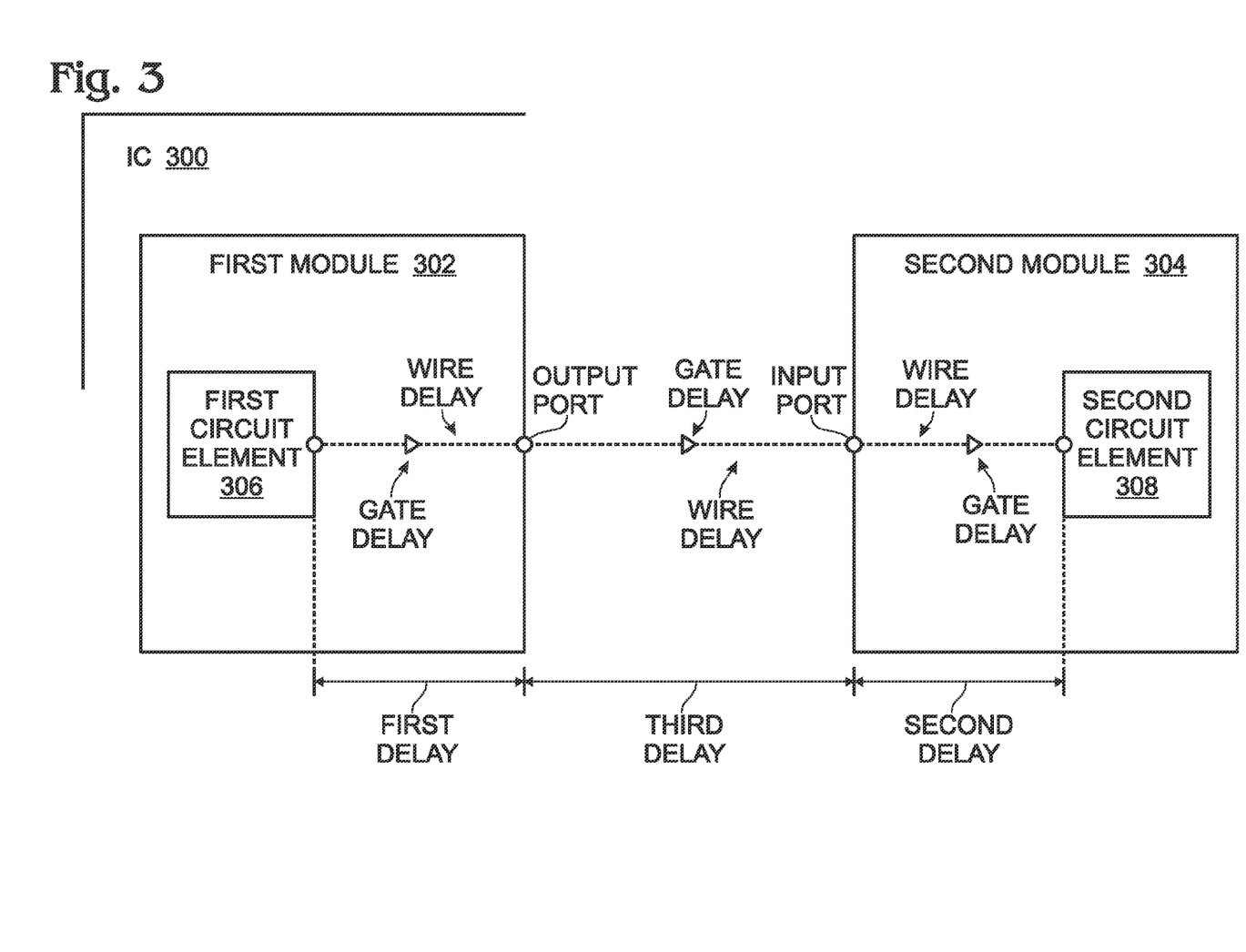
FIG. 3 is a plan view of the floor-plan described in Step 202 of FIG. 2.

FIG. 3 is a plan view of the floor-plan described in Step 202 of FIG. 2. The figure depicts IC 300 with first module 302 and second module 304. Also shown are the first circuit element 306, second circuit element 308, the first delay, the second delay, and the third delay.

Returning to FIG. 2, the floor-plan may be provided to the operator performing the instructions as a given condition. In so, the operator may have the option of editing the floor-plan. Alternatively, the floor-plan may be entered by the operator. If the floor-plan is edited or entered, the instructions may provide default suggestions or a menu of options. Alternatively, the operator may manually enter some elements of the floor-plan.

Step 204 accepts a command defining a first maximum delay value. Again, the maximum value may be provided in the instructions or entered by the operator. Step 206 estimates a first delay value between the first circuit element signal output interface and the first module output port. The estimate may be made based upon application default assumptions, menu selections offered to the operator, or unprompted entries made by the operator. Step 208 estimates a second delay value between the second circuit element signal input interface and the second module input port. Step 210 estimates a third delay value between the first module output port and the second module input port. Again, the estimates of Steps 208 and 210 may be made based upon application default assumptions, menu selections offered to the operator, or unprompted entries made by the operator.

In Step 212 the first, second, and third delay values are summed, creating a time budget estimate. In Step 214 the time budget estimate is approved in response to the time budget estimate being less than the first maximum delay value. If the time budget estimate is not approved, the operator may return to Step 202 to revise the floor-plan, or go to Step 204 to revise the first maximum delay value. Alternatively, as described in more detail below, the estimates made in Steps 206 through 210 may be modified.

More explicitly, estimating the first delay value includes the following sub-instructions. Step 206a estimates a first gate delay between the first circuit element signal output interface and the first module output port. In one aspect, the first gate delay includes any delay associated with first circuit element 306 (see FIG. 3), as well as the delay associated with any gates (not shown) between the first circuit element and the first module output port. The gate delay may also include the effects of fanout (e.g., capacitance) to other modules and circuit elements (not shown). Note: in this step software application assumptions may be used. As explained in more detail below, the assumptions may include delay values associated with gates and the number of intervening gates. Alternatively, the operator may be prompted with a menu of options, or may enter an unprompted value. Step 206b estimates a first wire delay between the first circuit element signal output interface and the first module output port. Again, software application assumptions may be used that include the length and gauge of wire. Alternatively, the operator may be prompted with a menu of options, or may enter an unprompted value. Step 206c sums the first gate delay with the first wire delay.

Likewise, estimating the second delay value includes the following sub-instructions. Step 208a estimates a second gate delay between the second circuit element signal input interface and the second module input port. Step 208b estimates a second wire delay between the second circuit element signal input interface and the second module input port. Step 208c sums the second gate delay with the second wire delay. Finally, estimating the third delay value in Step 210 may include the following sub-instructions. Step 210a estimates a third gate delay between the second module input port and the first module output port. Step 210b estimates a third wire delay between the second module input port and the first module output port, and Step 210c sums the third gate delay with the third wire delay.

In another aspect, estimating the first gate delay in Step 204a may include the following sub-instructions. Step 206a1 estimates the number of gates between the first circuit element signal output interface and the first module output port. Step 206a2 estimates the delay per gate. Step 206a3 multiplies the number of gates times the delay per gate. The estimations made in Step 206a1 may be further differentiated by estimating gate types and the number of gates associated with each gate type, so that Step 206a2 estimates the delay per each type of gate.

In one aspect, estimating the first wire delay in Step 206b includes the following sub-instructions. Step 206b1 estimates the length of wire. Step 206b2 estimates the delay per wire length, and Step 206b3 multiplies the wire length times the delay per length. Further, estimating the delay per wire length may include Step 206b2a of estimating the wire thickness. Step 206b2b may estimate the distance to a nearest adjacent wire in the consideration of inductance. Step 206b2c estimates the resistance of the wire per unit length. In one aspect the dielectric of the underlying substrate is also considered. Although not as completely depicted as sub-instructions, the above-described details of Steps 206a and 206b would likewise apply to the estimation of the second and third delays.

Figure 4:
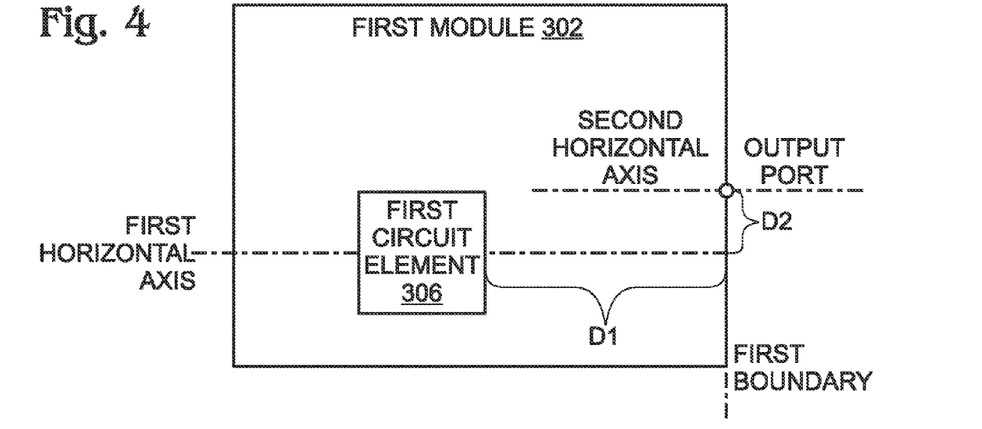
FIG. 4 is a plan view depicting a first variation of the floor-plan of FIG. 3.

FIG. 4 is a plan view depicting a first variation of the floor-plan of FIG. 3. In the variation of FIG. 4, Step 202 locates the first module output port on a first boundary of the first module. Then, estimating the length of wire in Step 206b1 includes estimating a distance between a position of the first circuit element in the first module and the first boundary. More explicitly, in Step 202 the first circuit element position may be located along a first horizontal axis and the first module output port being located along a second horizontal axis, normal to the first boundary. Then, estimating the distance between first circuit element position and the first boundary may include the following sub-instructions. Step 206b1a estimates a distance between first circuit element position and the first boundary along the first horizontal axis (D1). Step 206b1b estimates a distance between the first horizontal axis and second horizontal axis (D2). In one aspect (not shown), it is assumed that the first horizontal axis bisects the first boundary. That is, D2=zero.

Figure 5:
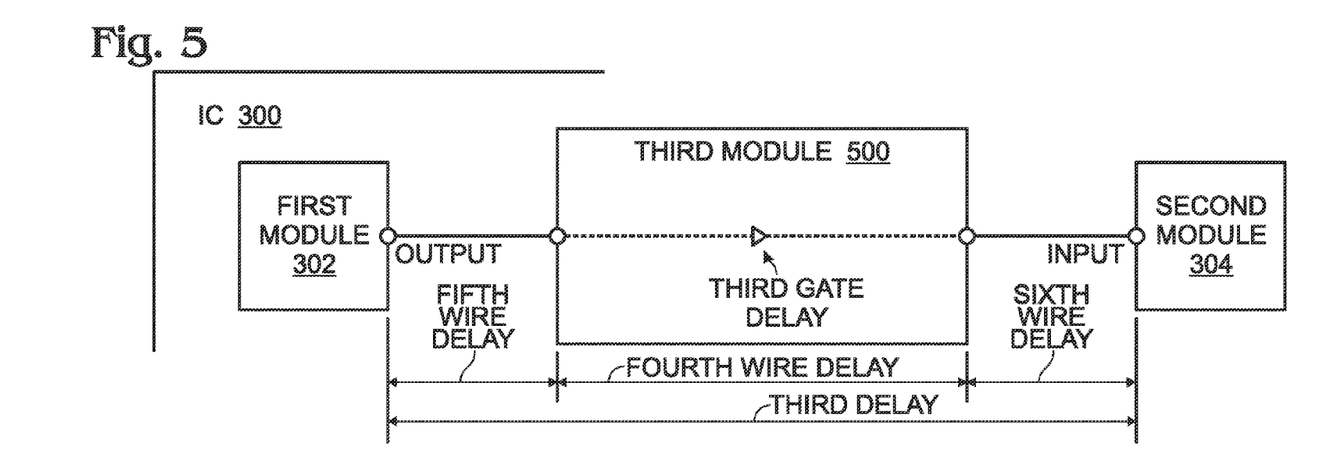
FIG. 5 is a plan view depicting a second variation of the floor-plan of FIG. 3.

FIG. 5 is a plan view depicting a second variation of the floor-plan of FIG. 3. In the variation of FIG. 5 Step 202 enables an IC floor-plan with a third module 500 with an input port and an output port, interposed between the first module 302 and second module 304. Then, estimating the third gate delay value in Step 210a includes estimating the third gate delay between the third module input port and the third module output port. Estimating the third wire delay in Step 210b includes the following sub-instructions. Step 210b1 estimates a fourth wire delay between the third module input port and the third module output port. Step 210b2 estimates a fifth wire delay between the third module input port and the first module output port. Step 210b3 estimates a sixth wire delay between the third module output port and the second module input port. Step 210b4 sums the fourth, fifth, and sixth wire delays.

Figure 6:
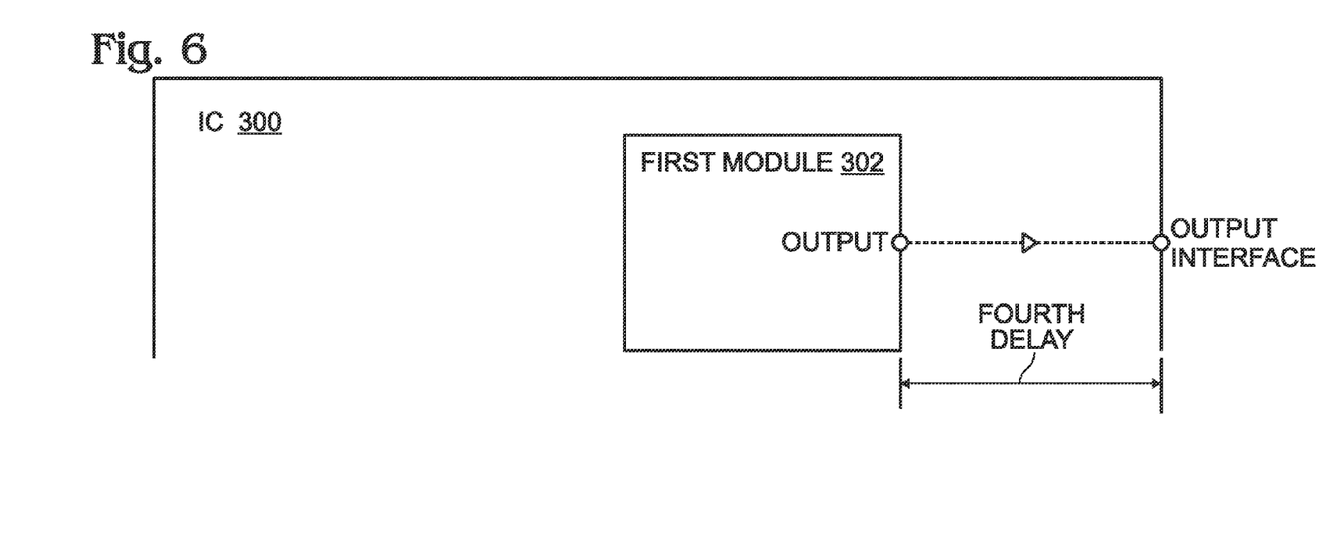
FIG. 6 is a plan view depicting a third variation of the floor-plan of FIG. 3.

FIG. 6 is a plan view depicting a third variation of the floor-plan of FIG. 3. In the variation of FIG. 6, Step 202 enables the first module 302 as a sub-component in a master module (i.e. IC 300) having an output interface. Accepting the command defining the first maximum delay in Step 204 further includes accepting a second maximum delay value between the first module output interface and the master module output interface. Step 211a estimates a fourth delay between the first module output interface and the master module output interface, and approving the time budget in Step 214 includes the fourth delay being less than the second maximum delay value. Although not explicitly shown, Step 211a may include all the sub-instructions described above under Step 206.

Figure 7:
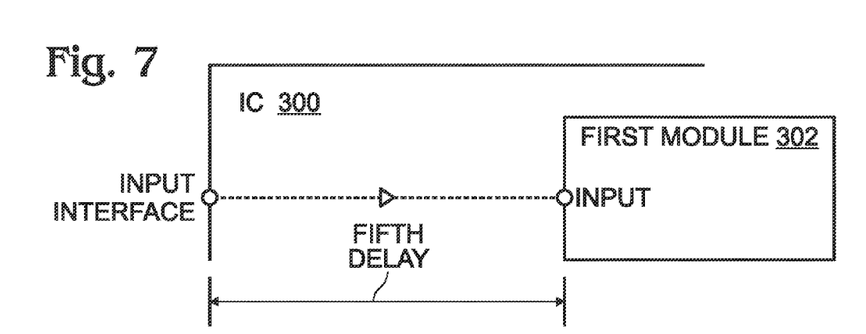
FIG. 7 is a plan view depicting a fourth variation of the floor-plan of FIG. 3.

FIG. 7 is a plan view depicting a fourth variation of the floor-plan of FIG. 3. In the variation of FIG. 7, Step 202 enables the first module 302 as a sub-component in master module 300 having an input interface. Accepting a command defining the first maximum delay further in Step 204 includes accepting a third maximum delay value between the first module input interface and the master module output interface. Step 211b estimates a fifth delay between the first module input interface and the master module input interface, and approving the time budget in Step 214 includes the fifth delay being less than the third maximum delay value. Although not explicitly shown, Step 211b may include all the sub-instructions described above under Step 206.

Figure 8:
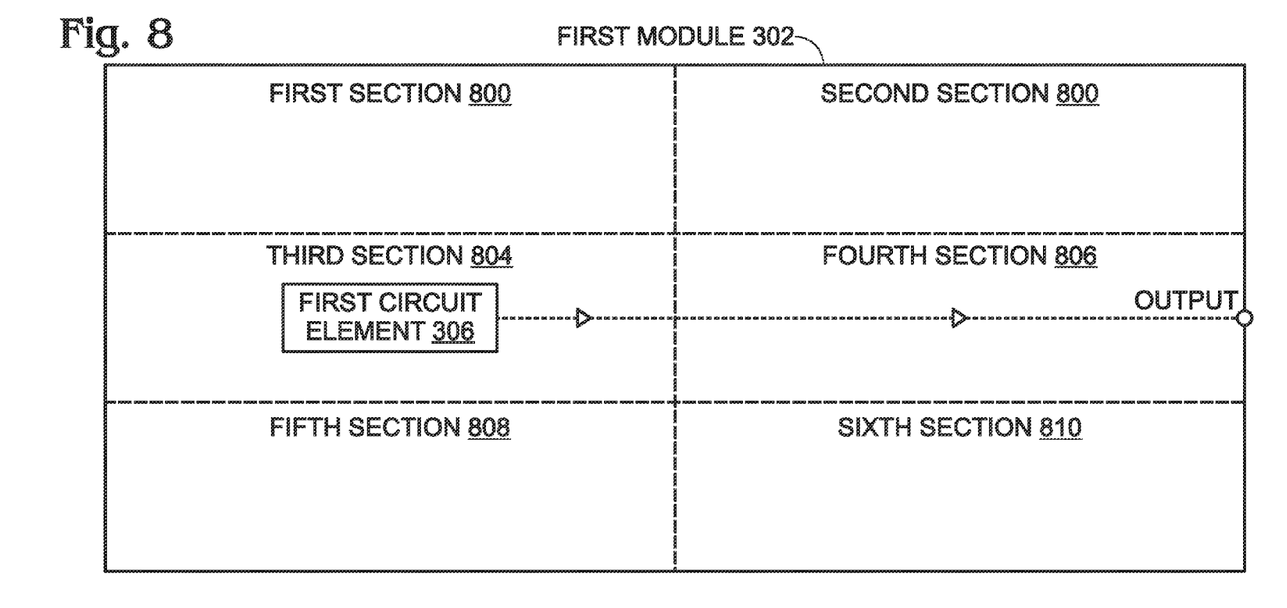
FIG. 8 is a plan view depicting a fifth variation of the floor-plan of FIG. 3.

FIG. 8 is a plan view depicting a fifth variation of the floor-plan of FIG. 3. In the variation of FIG. 8, Step 202 enables the first module with a third section 804, including the first circuit element 306, and a fourth section 806. Then, estimating the gate delays in Step 206a includes estimating the gate delays between the first circuit element signal output interface, through the third section, to the fourth section, as well as the gate delays through the fourth section to the first module output port. Likewise, estimating wire delays in Step 206b includes estimating the wire delays between the first circuit element signal output interface, through the third section, to the fourth section, as well as through the fourth section to the first module output port.

Figure 9:
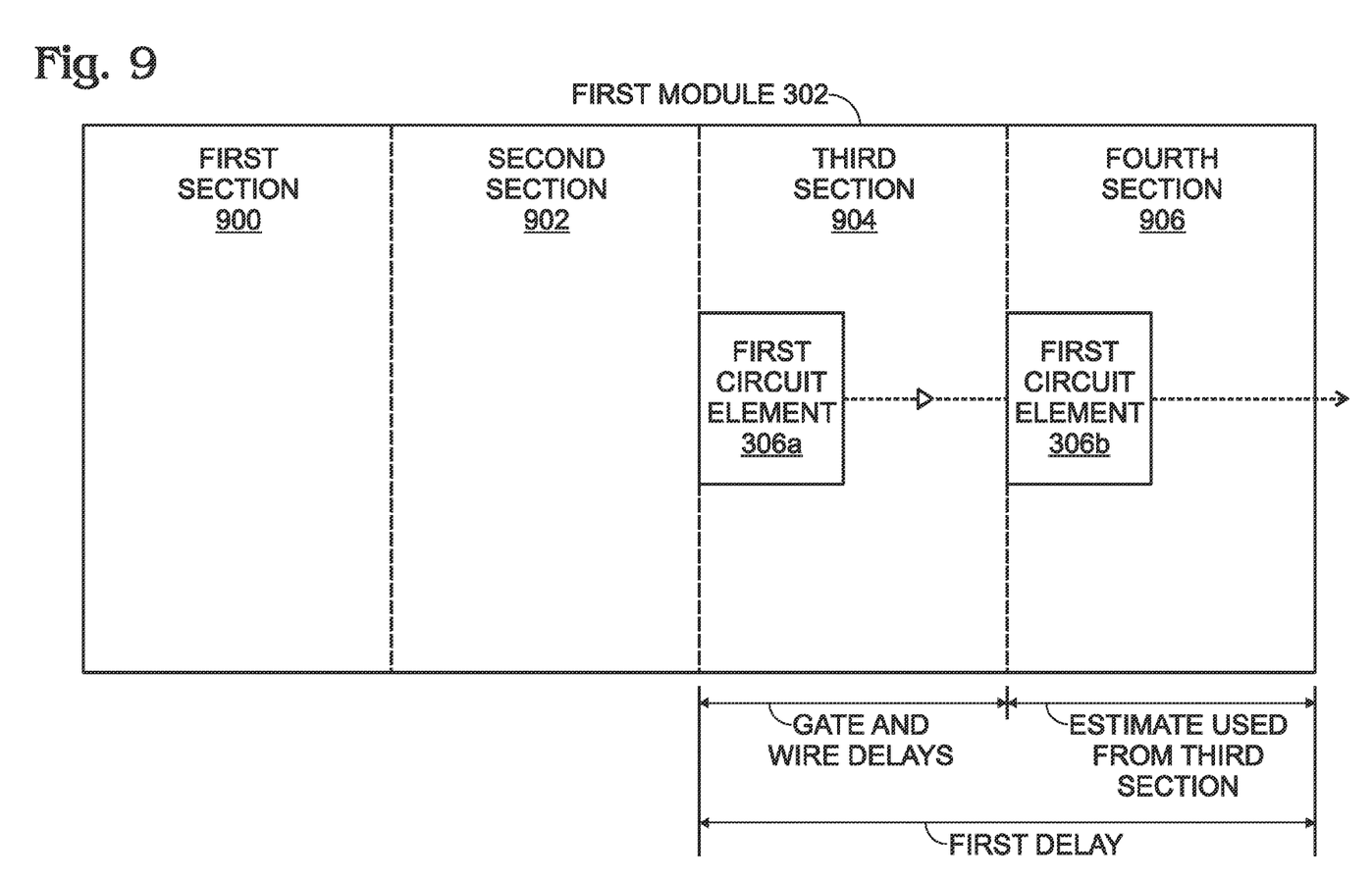
FIG. 9 is a plan view depicting a sixth variation of the floor-plan of FIG. 3.

FIG. 9 is a plan view depicting a sixth variation of the floor-plan of FIG. 3. In the variation of FIG. 9, Step 202 enables the first module 302 with a third section 904 and a fourth section 906, each section including a first circuit element 306. As depicted in FIG. 9, estimating the first delay value in Step 206 includes:

estimating a gate delay between the first circuit element signal output interface, through the third section, to the fourth section;

estimating a wire delay between the first circuit element signal output interface, through the third section, to the fourth section; and, using the combination of gate delays and wire delays through the third section to determine delay in the fourth section.

The following steps are an alternate explanation of the flowchart of FIGS. 2A and 2B, to determine the time-budgets for module in an IC, or sub-modules in a module:

A. Identify the sub-modules for a given design, and create a floor-plan. Assign the location of the input and output pins of these sub-modules based on the floor-plan and the connectivity between these sub-modules.

B. For each sub-module:
  1) Read the interface-pins as assigned from the top-level. The interface pins can also be re-assigned by the sub-module if desired.
  2) For each interface timing path:
    a) Identify the location of the source or destination flop (assign a section), type of wire that can be used to connect to the flops, the number of gate-delays estimated in the path, any high fan-out nets in the path, etc.
    b) The estimated wire-delay of the path is estimated as a function of the distance between the interface pins and the source/destination flop and the wire-type to be used.
    c) The gate-delay is a sum of the delays of the gates estimated for each path, the delay due to the flop setup or flop access, and any fan-out overhead there may be.
    d) The estimated budget can be derived from 2a and 2b.

C. At the top-level, for each inter sub-module path:
  1) Sum up the interface timing budgets from the corresponding sub-modules as derived using (B).
  2) Add the extra wire-delay of the nets between the sub-module interface pins.
  3) The estimated delay of the path can be derived from (C1) and (C2).
  4) If this delay is greater than the required cycle time, there is a violation, and the sub-module timing budgets need to be changed—going back to step (B).

D. At the top-level, when the sub-module timing budgets are sufficient, and there are no violations, the sub-modules can now be designed independently with their allotted timing budgets.

Methods have been provided for IC design time budget estimation. Particular circuit elements and process steps have been used to illustrate the invention, but the invention is not necessarily limited to just these examples. Other variations and embodiments of the invention will occur to those skilled in the art.

We claim:

1. A computer readable non-transient storage medium storing instructions for causing a processor to estimate time delays during a floor planning process by performing the operations of:

accepting an Integrated Circuit (IC) floor-plan that comprises floor space allocation for a first module and a second module;

accepting a command defining a maximum delay value;

estimating a first delay value between a first circuit element signal output interface that is disposed in the first module and a first module output port based on estimated timing factors derived from the IC floor-plan;

estimating a second delay value between a second circuit element signal input interface that is disposed in the second module and a second module input port based on estimated timing factors derived from the IC floor-plan;

estimating a third delay value between the first module output port and the second module input port based on estimated timing factors derived from the IC floor-plan;

summing the first, second, and third delay values to create a time budget estimate;

adjusting the IC floor plan or the maximum delay value to reduce time delays if the time budget estimate is greater than the maximum delay value.

2. The computer readable non-transient storage medium of claim 1 wherein estimating the first delay value includes:

estimating a first gate delay between the first circuit element signal output interface and the first module output port;

estimating a first wire delay between the first circuit element signal output interface and the first module output port;

summing the first gate delay with the first wire delay;

wherein estimating the second delay value includes:

estimating a second gate delay between the second circuit element signal input interface and the second module input port;

estimating a second wire delay between the second circuit element signal input interface and the second module input port;

summing the second gate delay with the second wire delay;

wherein estimating the third delay value includes:

estimating a third gate delay between the second module input port and the first module output port;

estimating a third wire delay between the second module input port and the first module output port; and, summing the third gate delay with the third wire delay.

3. The computer readable non-transient storage medium of claim 2 wherein estimating the first gate delay between the first circuit element signal output interface and the first module output port includes:

estimating a number of gates between the first circuit element signal output interface and the first module output port;

estimating a delay per gate; and, multiplying the number of gates times the delay per gate.

4. The computer readable non-transient storage medium of claim 3 wherein estimating the number of gates between the first circuit element output interface and the first module output port includes estimating gate types and a number of gates associated with each gate type; and, wherein estimating the delay per gate includes estimating the delay per each type of gate.

5. The computer readable non-transient storage medium of claim 2 wherein estimating the first wire delay between the first circuit element signal output interface and the first module output port includes:

estimating a length of wire;

estimating a delay per wire length; and, multiplying the wire length times the delay per length.

6. The computer readable non-transient storage medium of claim 5 wherein estimating the delay per wire length includes:

estimating the wire thickness;

estimating a distance to a nearest adjacent wire; and, estimating the resistance of the wire per unit length.

7. The computer readable non-transient storage medium of claim 5, wherein the operations further comprise locating the first module output port on a first boundary of the first module; and, wherein estimating the length of wire includes estimating a distance between a position of the first circuit element in the first module and the first boundary.

8. The computer readable non-transient storage medium of claim 7, wherein the operations further comprises locating the first circuit element position along a first horizontal axis and locating the first module output port along a second horizontal axis, normal to the first boundary; and wherein estimating the distance between first circuit element position and the first boundary includes:

estimating a distance between first circuit element position and the first boundary along the first horizontal axis; and, estimating a distance between the first horizontal axis and the second horizontal axis.

9. The computer readable non-transient storage medium of claim 8 wherein the first horizontal axis bisects the first boundary.

10. The computer readable non-transient storage medium of claim 2 wherein the IC floor-plan further comprises floor space allocation for a third module with an input port and an output port, interposed between the first and second modules;

wherein estimating the third gate delay value includes estimating the third gate delay between the third module input port and the third module output port;

wherein estimating the third wire delay includes:

estimating a fourth wire delay between the third module input port and the third module output port;

estimating a fifth wire delay between the third module input port and the first module output port;

estimating a sixth wire delay between the third module output port and the second module input port; and, summing the fourth, fifth, and sixth wire delays.

11. The computer readable non-transient storage medium of claim 1 wherein the first module is configured as a subcomponent in a master module having an output interface; and, wherein accepting the command defining the first maximum delay further includes accepting a second maximum delay value between the first module output interface and the master module output interface;

wherein the operations further comprise:

estimating a fourth delay between the first module output interface and the master module output interface; and, comparing the fourth delay with the second maximum delay value.

12. The computer readable non-transient storage medium of claim 1 wherein the first module is configured as a subcomponent in a master module having an input interface; and, wherein accepting a command defining the first maximum delay further includes accepting a third maximum delay value between the first module input interface and the master module output interface;

the operations further comprise:

estimating a fifth delay between the first module input interface and the master module input interface; and, comparing the fifth delay being with the third maximum delay value.

13. The computer readable non-transient storage medium of claim 1 wherein the first module comprises a first section, including the first circuit element, and a second section;

wherein estimating the first delay value includes:
    estimating gate delays between the first circuit element signal output interface, through the first section, to the second section;
    estimating gate delays through the second section to the first module output port;
    estimating wire delays between the first circuit element signal output interface, through the first section, to the second section; and,
    estimating wire delays through the second section to the first module output port.

14. The computer readable non-transient storage medium of claim 1 wherein the first module comprises a first section and a second section, each section including a first circuit element;
    wherein estimating the first delay value includes:
        estimating a gate delay between the first circuit element signal output interface, through the first section, to the second section;
        estimating a wire delay between the first circuit element signal output interface, through the first section, to the second section; and,
        using the combination of gate delays and wire delays through the first section to determine delay in the second section.

15. A system comprising:
at least one processor;
a memory coupled to the at least one processors, the memory storing instructions, upon execution by said at least one processor, for estimating time delays during an IC floor planning process, by performing operations of:
    receiving an IC floor-plan that includes tentative physical arrangements for a first module and a second module, wherein the first module includes a first circuit element having a signal output interface and an output port, and wherein the second module includes an input port and a second circuit element having a signal input interface;
    defining a delay value limit;
    estimating a first time delay value between the first circuit element signal output interface and the first module output port based on the expected timing factors derived from the IC floor-plan;
    estimating a second delay value between the second circuit element signal input interface and the second module input port based on the expected timing factors derived from the IC floor-plan;
    estimating a third delay value between the first module output port and the second module input port based on the expected timing factors derived from the IC floor-plan;
    creating a time budget estimate based on the first, the second and the third time delay values; and
    adjusting the IC floor-plan or the delay value limit to reduce time delays if the time budget estimate is greater than the delay value limit.

16. The system as described in claim 15, wherein the time budget estimate is a sum of the first, the second and the third time delay values.

17. The system as described in claim 15, wherein estimating the first, the second, and the third time delay values includes estimating the first, the second, and the third time delay values based on gate delays and wire delays derived from the tentative physical arrangements in the IC floor-plan for the first module and the second module.

18. The system as described in claim 17, wherein the tentative physical arrangements for the first module and the second module in the IC floor-plan comprise one or more of lengths of wires thicknesses of wires, distances between wires, gate types, number of gates associated with each type of gates, locations of boundaries, unit resistance of a wire, unit dielectric of a substrate, and distances between circuits for the first module and the second module.

19. The system as described in claim 18, wherein a gate delay in a respective time delay value is estimated by combining a number of corresponding gates and a delay per gate, and wherein further a wire delay in a respective time delay value is estimated by combining length of wires and a delay per wire length.

20. The system as described in claim 15, wherein the first module has a first section and a second section, each of the first and the second sections includes a first circuit element;
    wherein estimating the first delay value includes:
        estimating a gate delay between the first circuit element signal output interface, through the first section, to the second section;
        estimating a wire delay between the first circuit element signal output interface, through the first section, to the second section; and
        using the combination of gate delays and wire delays through the first section to determine delays in the second section.

* * * * *